(12) United States Patent
Loertscher

(10) Patent No.: US 6,227,418 B1
(45) Date of Patent: May 8, 2001

(54) DOSING AND MEASURING DEVICE FOR FLOWING MEDIA

(75) Inventor: Ulrich Loertscher, Zurich (CH)

(73) Assignee: Createchnic AG, Nurensdorf (CH)

( * ) Notice: Subject to any disclaimer, the term of this patent is extended or adjusted under 35 U.S.C. 154(b) by 0 days.

(21) Appl. No.: 09/403,758

(22) PCT Filed: Jul. 26, 1999

(86) PCT No.: PCT/CH99/00346

§ 371 Date: Nov. 24, 1999

§ 102(e) Date: Nov. 24, 1999

(87) PCT Pub. No.: WO00/08425

PCT Pub. Date: Feb. 17, 2000

(30) Foreign Application Priority Data

Aug. 3, 1998 (CH) .................................. 1621/98

(51) Int. Cl.$^7$ ...................................... G01F 11/28
(52) U.S. Cl. .................... 222/438; 222/449; 222/450
(58) Field of Search ................... 222/143, 434, 222/438, 450, 444, 449, 158

(56) References Cited

U.S. PATENT DOCUMENTS

| 3,910,467 | * 10/1975 | Nilson | 222/449 |
| 4,105,142 | 8/1978 | Morris, Jr. | 222/158 |
| 4,903,740 | * 2/1990 | Corniea et al. | 222/450 |
| 5,031,802 | 7/1991 | Joulia | 222/205 |
| 5,292,039 | 3/1994 | Neofitou | 222/424 |

FOREIGN PATENT DOCUMENTS

| 254138 | * 1/1988 | (EP) | 222/548 |

* cited by examiner

Primary Examiner—Philippe Derakshani
(74) Attorney, Agent, or Firm—Weingarten, Schurgin, Gagnebin & Hayes LLP

(57) ABSTRACT

Permanently or detachably mounted on a container (1) is a dosing and metering device that contains a pressure bellows (3), through which a valve-plate holder (8) passes. The valve-plate holder (8) essentially has the shape of a hollow cylinder and exhibits gaps or lateral openings (18), to enable communicating contact between pressure bellows (3) and container (1). The valve-plate holder (8) is arranged in a transition zone between pressure bellows (3) and container (1), in a fixed position relative to the container or container neck. The valve plate (7) attached to the end of the valve-plate holder (8) forms a valve seat (4) together with the constriction (31) between pressure bellows (3) and the metering chamber (5) that follows it. Axial pressure upon the metering chamber (5) allows the metering chamber to be entirely or partly filled or drained back into the container, as desired, in which case the contents of the metering chamber can be poured out when the cap is removed.

18 Claims, 3 Drawing Sheets

DOSING AND MEASURING DEVICE FOR FLOWING MEDIA

The invention concerns a device on a rigid or deformable container with a container neck, for the dosage and delivery of a variable, measurable quantity of a medium that can flow, trickle or be poured, according to the description of patent claim 1.

Containers on which such devices are installed are employed with the container neck pointing downward, in which case manual pressure on the device enables the medium in the container to flow into a metering chamber, until a desired quantity is reached. If the manual pressure on the device, in the direction of the bottle, is released, the flow is stopped.

Known dosing and metering devices are known in the most diverse execution variants. Their configuration is thereby dependent essentially upon the type of container on which they are installed. For example, such devices are installed on bottles for alcoholic beverages and are only suitable for dosing very specific, always identical quantities. Other devices, for example, those for dentifrice mouthwashes, require deformable containers in order to discharge the liquid into a metering chamber, their return flow being made impossible by a type of siphon. If not all the dosed quantity is used, the residual quantity will remain in the metering chamber, which is not tight enough to keep the residual quantity from drying out. This leads not only to unhygienic conditions, but often likewise impairs the operation of the device, or makes it impossible.

There are many known dosing devices which are not tight or not precise. Finally, however, dosing and metering devices are also known that belong rather to the realm of the laboratory and that, if only by reason of cost, are not usable in the consumer field of interest here, It is consequently the task of the present invention to create a simple dosing and metering device, in particular one that can be produced simply using plastics technology, in which the above-indicated disadvantages are avoided.

This problem is solved by a dosing and metering device of the type initially named, with the characterizing features of patent claim 1. In the case of this solution a pressure bellows with a valve seat is positioned between container and metering chamber, which contains an internal valve. Further advantageous execution variants of the invented object issue from the following claims, and their significance and mode of operation can be determined from the following description. Various advantageous execution variants of the invented object are illustrated in the drawing and described below.

Figure 1:
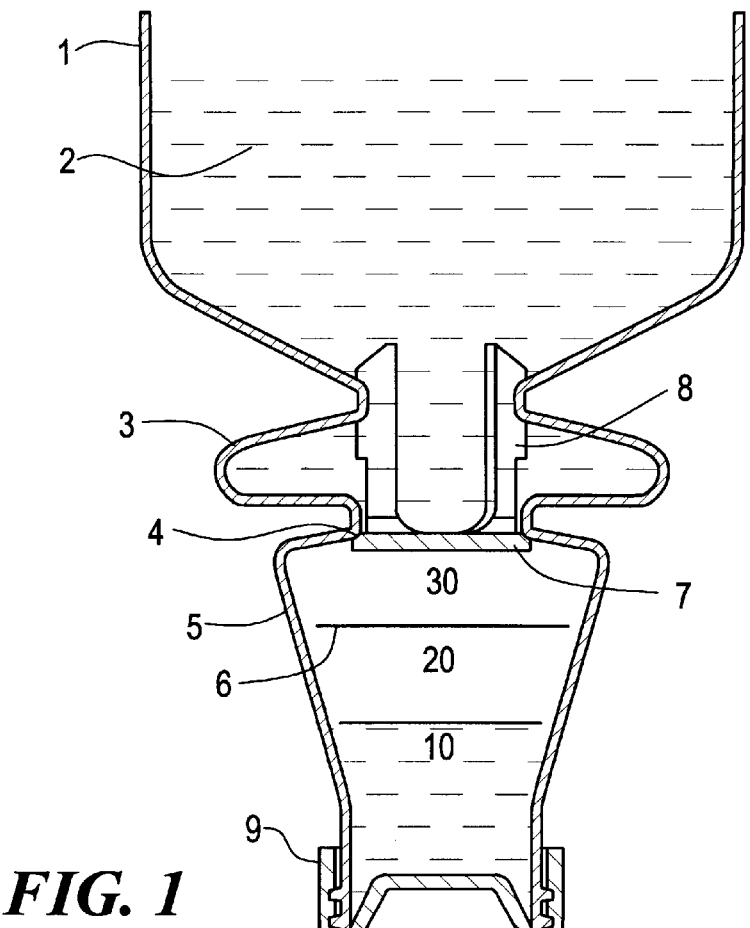
FIG. 1 is an axial, vertical section through a device according to the invention, in which the container is integrally formed with the pressure bellows and the metering chamber.

The invented dosing and metering device, seen in a vertical section in FIG. 1, is in the working position, that is to say, the container is standing on its head. The container 1 can have practically any size or shape. The container can also be produced from any material the variant illustrated in FIG. 1 features a plastic container which can be manufactured by means of blow-molding or injection-blowing technology. The container 1 or vessel 1 is here partially filled with a medium capable of flowing, trickling or being poured. Examples include concentrated cleaning agents which are to be diluted at a later time, but also liquid fertilizers or pharmaceutical products, which can be later diluted and delivered in a metered quantity. In contrast to other dosing and metering devices, the container need only be held upside down only during the filling of the metering chamber. The container can them be turned over without difficulty, and the closure 9 opened or unscrewed to deliver the metered quantity of flowable medium. The container 1 exhibits a narrowed section which acts for practical purposes like a bottle neck, forming a transition zone 30 between the container 1 and the following pressure bellows 3. The pressure bellows 3 can exhibit one or more bellows folds. The drawing illustrates an execution variant with a single bellows fold. At the end of the bellows, in the direction of outflow, is a second constriction 31, which forms the transition from the bellows 3 to the metering chamber 5 that follows it. The shape and the size can be practically any desired. If a transparent plastic is used to manufacture the container 1, pressure bellows 3 and metering chamber 5, the metering chamber 5 can be easily provided with a corresponding measuring scale, so that the dosage quantity can be set, as desired, according to the measuring scale. The lower end of the of the metering chamber can be closed with a cap 9. The cap 9 can be a simple turning cap, as show here, or a screw-on, snap-hinge closure with sealable pouring spout.

A valve-plate holder 8 extends through the axial length of the pressure bellows 3. The valve-plate holder 8 is configured as a hollow cylinder and exhibits at least one opening facing radially outward, so that the container 1 and the interior space of the pressure bellows 3 are in continuous communicating contact. Correspondingly, not only a single elongated, lateral opening 18 entirely through the wall is advantageously provided, but that end extending into the container 1 is configured to be completely open.

The valve-plate holder 8 is held in the transition zone 30 from the container 1 to the pressure bellows 3 by shape- and/or force-fitting. This can be effected, for example, by cementing, welding or another conventional type of bonding; or, as shown here in FIG. 1, the valve-plate holder 8 exhibits a peripheral annular groove, in which the transition zone 30 from the container 1 to the pressure bellows 3 is also held force-fit by the elasticity of the material. The force fit can be additionally supported, because the valve-plate holder, in the shape of a hollow cylinder, can be made radially elastic by means of the elongated openings 18.

That end of the valve-plate holder 8 facing the discharge port of the metering chamber is closed by a valve plate 7. The diameter of this valve plate 7 is at least slightly greater than that of the valve-plate holder 8. A collar thus remains, which acts, in conjunction with the constriction 31 between pressure bellows 3 and metering chamber 5, as a valve seat. This construction 31 can be additionally designed so that it acts to some extent as a guide for the valve-plate holder 8. The pressure bellows 3 is formed so that, when installed, the constriction 31 will lie with pressure against the projecting collar of the valve plate 7. In the case of this solution, the static force in the pressure bellows 3 will be increased by pressure upon the container 1, by which means, in principle, the closing force also increases. This ensures that, after dosage, the dosage will not be changed by inept handling.

Figure 2:
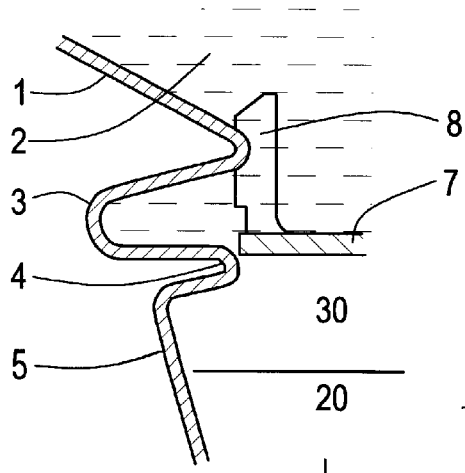
FIG. 2 shows a partial section through the same solution according to FIG. 2, but where the pressure bellows 3 is an element which closes automatically under preset pressure.

The reversal of the system according to FIG. 1 is shown purely schematically, in a partial section, in FIG. 2. Here, too, the valve-plate holder 8 is of course again stationarily mounted in the transition zone 30 as before. However, the mode of operation differs in that dosage does not take place by pressure upon the metering chamber from below to the container, but rather by pulling in the direction of the arrow B. This requires that the pressure bellows 3 be designed so that it is able to close, in the relaxed state, by pulling back. This solution may be of importance only in quite exceptional cases.

Figure 3:
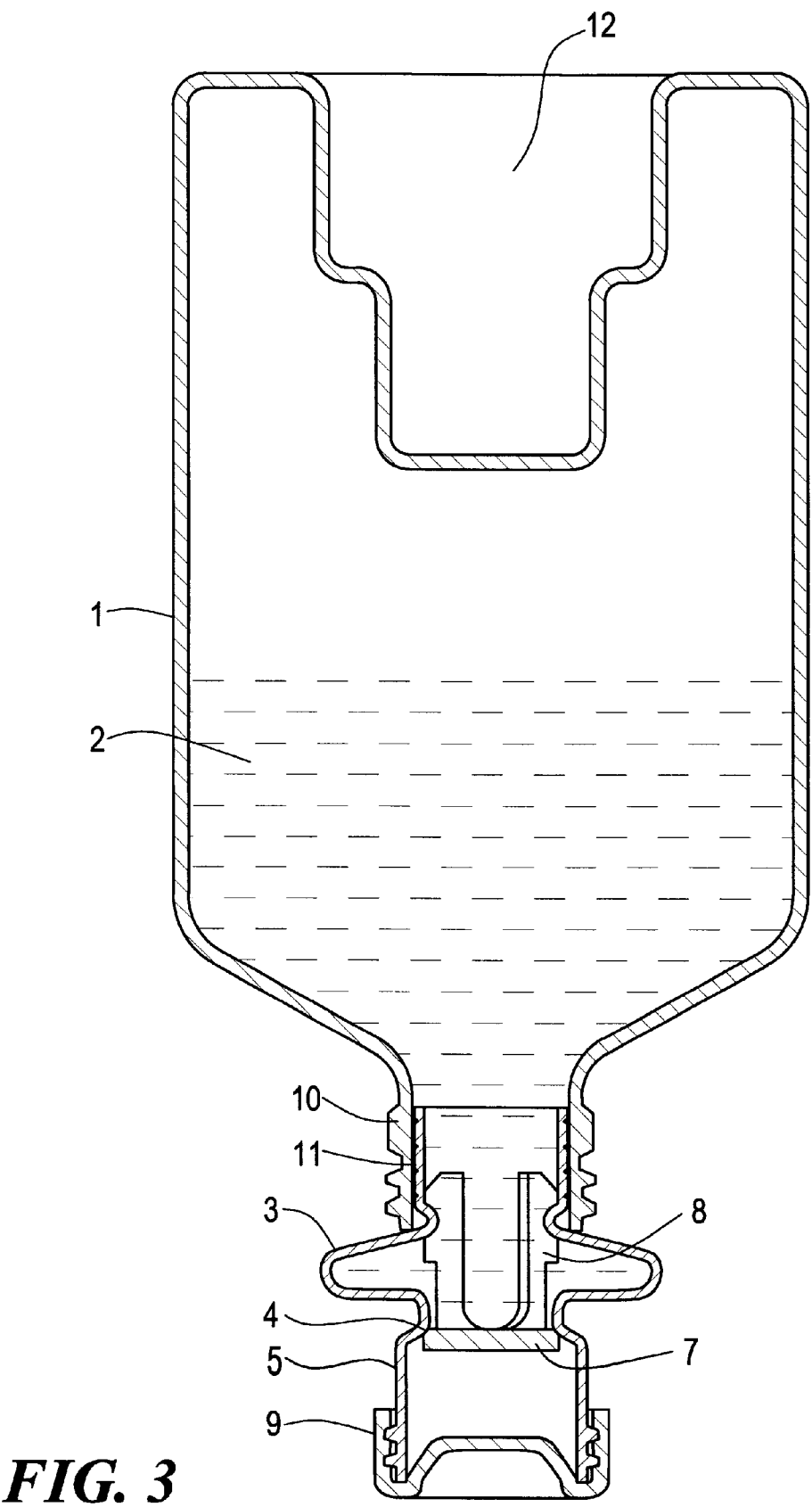
FIG. 3 shows a variant which is also suitable for rigid containers, the actual dosing and metering device being produced separately from the container.

FIG. 3 shows an execution variant in which the dosing and metering device is produced separately from the container 1. The container 1 correspondingly exhibits a container neck 10, and the pressure bellows 3 is connected, in the direction of the container 1, to a sealing tube 11. The sealing tube 11 fits into the container neck 10, forming a seal. The rest of the configuration corresponds however to the solution described in FIG. 1. The container 1 here exhibits a concave bottom 12. This concave bottom 12 is designed so that the as yet uninstalled dosing and metering device can be stored, during shipment, in the hollow formed by the concave bottom. It can in this way be protected, and space can be saved. This concave bottom 12, in a further advantageous execution variant, can be specially designed for the attachment of a stand, such as those frequently used for example in hospital environment.

Figure 4:
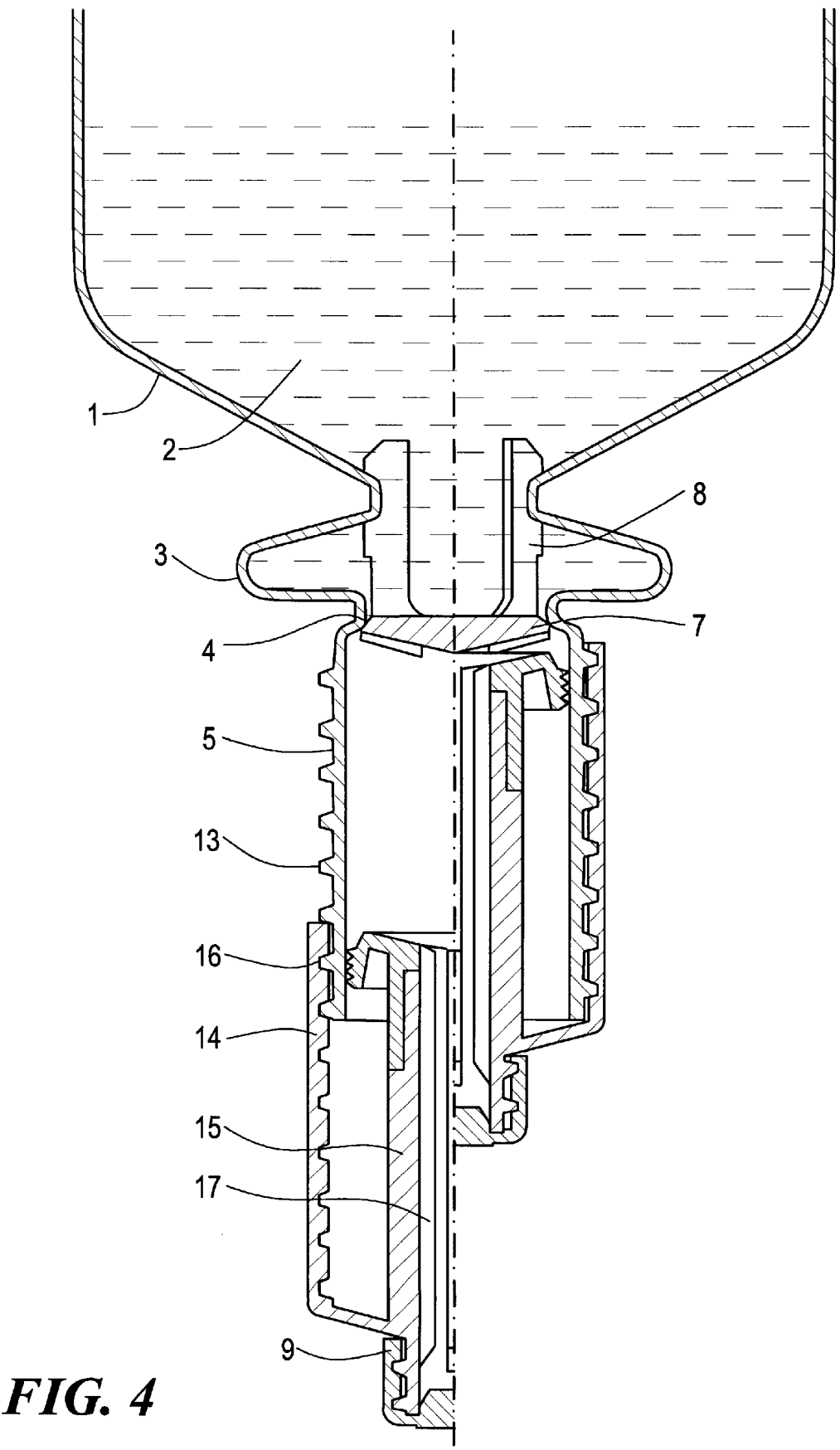
FIG. 4 shows an execution variant corresponding to that in FIG. 1, but where the metering chamber is configured as two telescoping parts.

FIG. 4 shows yet another solution, in which the container 1, the bellows 3 and the metering chamber 5 are produced as a single piece. In this case, however, the measuring chamber 5 exhibits an external thread 13, on which it is possible to screw the internally threaded extension tube 14. A movable or, as shown here, fixed tubular seal 15 extends through nearly the entire length of the threaded tube 14. The cylindrical interior space of the tubular seal 15 forms the spout 17. A sealing ring or sealing collar 16 is arranged at the end of the tubular seal 15. This sealing ring or sealing collar lies against the interior wall of the metering chamber 5 to form a seal. The outer end of the tube 15 is closed in turn by a cap 9. By screwing the metering chamber and the seal-forming, internally-threaded tube that fits onto it, in and out, it is thus possible to change the size of the metering and dosing chamber.

What is claimed is:

1. Dosing and metering device in a rigid or deformable container with container neck, for the dosage and delivery of a variable, measurable quantity of a medium capable of flowing, trickling or being poured, the device exhibiting a metering chamber arranged between bottle neck and a closable discharge opening, characterized by the fact that an axially movable pressure bellows, a valve seat and a valve plate are arranged in the direction of discharge before the metering chamber, in such a way that pressure upon or pulling the metering chamber produces a valve opening which again closes when the pressure of pulling force is removed.

2. Dosing or metering device on a rigid or deformable container with container neck, for the dosage and delivery of a variable, measurable quantity of a medium capable of flowing, trickling or being poured, the device exhibiting a metering chamber arranged between bottle neck and a closable discharge opening, characterized by the fact that a pressure bellows of variable length is arranged in the direction of discharge before the metering chamber, and that a valve-plate holder passes through the pressure bellows and is held on one side in a transition zone of the device to the pressure bellows, immovably relative to the bottle neck, by shape- and/or force-fitting, whereas the other side of the valve-plate holder exhibits a valve plate that forms a sealing valve seat with the wall of the device after the discharge end of the pressure bellows.

3. Device according to patent claim 1, characterized by the fact that the container, the pressure bellows and the metering chamber are produced as a single piece.

4. Device according to patent claim 1, characterized by the fact that the container, the pressure bellows and the metering chamber are each manufactured individually as separate pieces.

5. Device according to patent claim 1, characterized by the fact that the pressure bellows, in the mounted state of the device, lies against the valve plate under pressure, forming a seal.

6. Device according to patent claim 1, characterized by the fact that the pressure bellows exhibits at least one bellows plate.

7. Device according to patent claim 1, characterized by the fact that the metering chamber can be closed by a turning or snap-hinge cap.

8. Device according to patent claim 1, characterized by the fact that the device exhibits a sealing tube downstream of the pressure bellows, which is suitable for attachment to the neck of a container.

9. Device according to patent claim 1, characterized by the fact that the metering chamber is formed by two parts of variable size, that the position of a threaded tube which fits onto the open metering chamber, which is equipped with an external thread, can be axially adjusted, wherein a sealing ring or collar is held on a tubular seal passing through the center of the threaded tube and lies against it to form a seal, moving in an out according to the position of the threaded tube in the metering chamber, the volume of the latter being adjustable by this means.

10. Device according to patent claim 1, characterized by the fact that the pressure bellows and the metering chamber are arranged obliquely relative to the lengthwise axis of the containers.

11. Device according to patent claim 2, characterized by the fact that the container, the pressure bellows and the metering chamber are produced as a single piece.

12. Device according to patent claim 2, characterized by the fact that the container, the pressure bellows and the metering chamber are each manufactured individually as separate pieces.

13. Device according to patent claim 2, characterized by the fact that the pressure bellows, in the mounted state of the device, lies against the valve plate under pressure, forming a seal.

14. Device according to patent claim 2, characterized by the fact that the pressure bellows exhibits at least one bellows plate.

15. Device according to patent claim 2, characterized by the fact that the metering chamber can be closed by a turning or snap-hinge cap.

16. Device according to patent claim 2, characterized by the fact that the device exhibits a sealing tube downstream of the pressure bellows, which is suitable for attachment to the neck of a container.

17. Device according to patent claim 2, characterized by the fact that the metering chamber is formed by two parts of variable size, that the position of a threaded tube which fits onto the open metering chamber, which is equipped with an external thread, can be axially adjusted, wherein a sealing ring or collar is held on a tubular seal passing through the center of the threaded tube and lies against it to form a seal, moving in an out according to the position of the threaded tube in the metering chamber, the volume of the latter being adjustable by this means.

18. Device according to patent claim 2, characterized by the fact that the pressure bellows and the metering chamber are arranged obliquely relative to the lengthwise axis of the container.

* * * * *

UNITED STATES PATENT AND TRADEMARK OFFICE
CERTIFICATE OF CORRECTION

PATENT NO. : 6,227,418 B1  
DATED : May 8, 2001  
INVENTOR(S) : Ulrich Loertscher Page 1 of 1

It is certified that error appears in the above-identified patent and that said Letters Patent is hereby corrected as shown below:

Title page,
Item [54], title, "DOSING AND MEASURING DEVICE FOR FLOWING MEDIA" should read -- DEVICE FOR DOSING AND MEASURING FLUIDS --; and Column 1,
Lines 1 and 2, "DOSING AND MEASURING DEVICE FOR FLOWING MEDIA" should read -- DEVICE FOR DOSING AND MEASURING FLUIDS --.

Signed and Sealed this

Seventh Day of May, 2002

Attest:

JAMES E. ROGAN
*Attesting Officer*       *Director of the United States Patent and Trademark Office*